Oct. 26, 1926.
P. S. MOYER
1,604,709
AIR CONDITIONING MEANS
Filed June 11, 1923
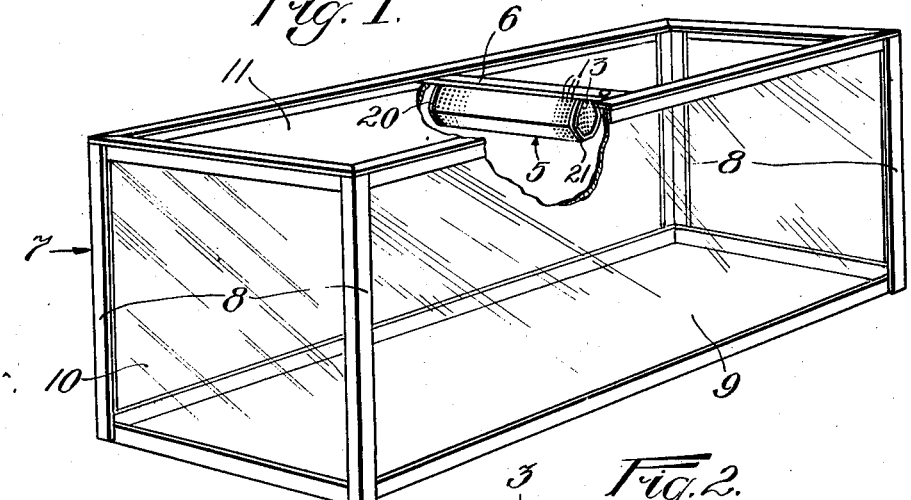
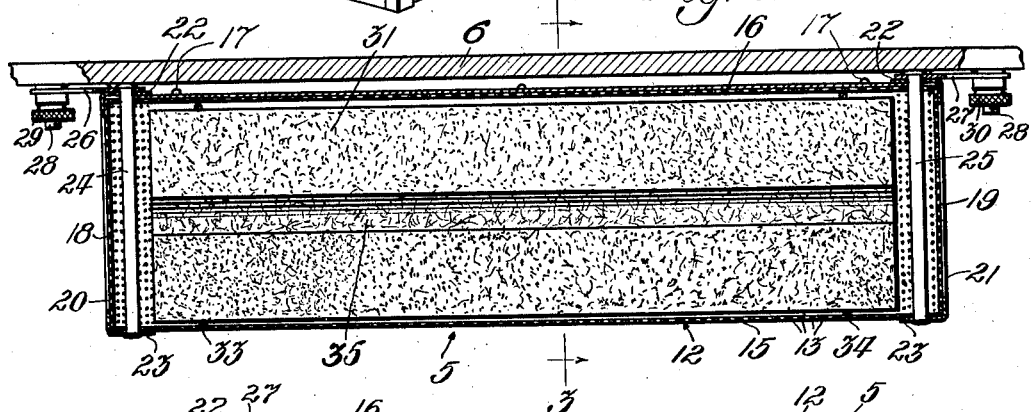
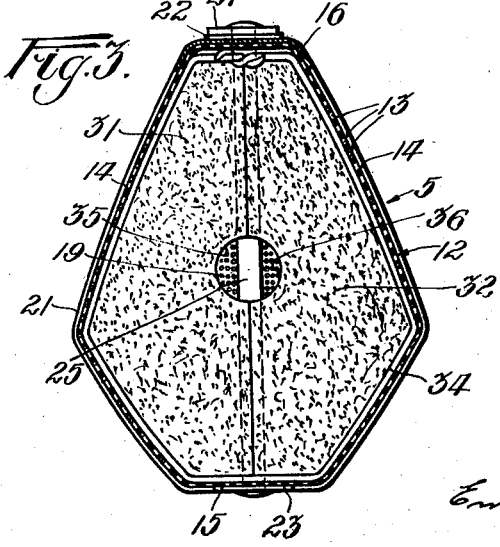
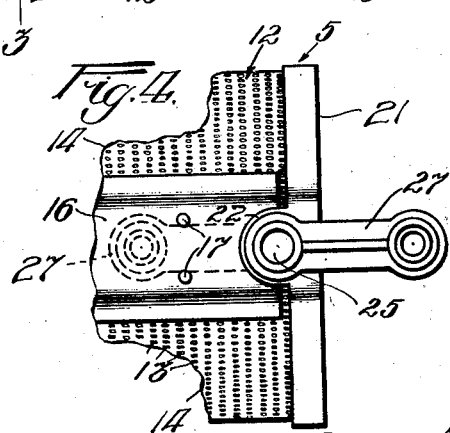
Inventor
Paul S. Moyer.
Emery, Booth, Janney & Varney.
Attys.

Patented Oct. 26, 1926.

1,604,709

UNITED STATES PATENT OFFICE.

PAUL S. MOYER, OF CHICAGO, ILLINOIS, ASSIGNOR TO THE ARIDOR COMPANY, OF CHICAGO, ILLINOIS, A CORPORATION OF ILLINOIS.

AIR-CONDITIONING MEANS.

Application filed June 11, 1923. Serial No. 644,572.

This invention relates to air conditioning means and particularly to means for dehydrating the air of enclosures, and is particularly adaptable for use in connection with enclosures for food products and the like, such, for example, as show cases, show windows, etc., whereby the contents of such enclosures may be preserved in a fresh and palatable condition and displayed in a pleasing and attractive manner.

Among other objects the invention is intended to provide a durable and efficient structure capable of being conveniently secured within a show case, window or other enclosure, and which will present a neat and pleasing appearance and be capable of convenient removal for the purpose of restoring its hygroscopic properties.

It is well known, that to preserve certain food products, mere refrigeration is not altogether satisfactory. Many food products are sensitive to changes of the moisture content of the air, usually caused by opening and closing the show case or the like, or produced by the products themselves. This moisture, if permitted to accumulate and condense, may produce a condition tending to cause the products to deteriorate very rapidly.

The invention is of especial importance when used in connection with enclosures such as show cases, and the like, wherein it is desired to preserve and display food products such as candies, fruits, fresh meat, etc., which of themselves are capable of emanating moisture.

The invention, when so used, not only acts as a preservative of the products by preventing the accumulation of moisture thereon, but also, in the event that the temperature of the atmosphere without the enclosure is lower than that within, the removal of the moisture from the air within the enclosure will prevent condensation of moisture accumulating on the walls thereof, which otherwise would become "steamed" or clouded, and seriously interfere with the display of the contents of the enclosure.

One illustrative embodiment of the invention is shown in the accompanying drawings, in which:

Fig. 1 is a perspective view illustrating a convenient form of device as applied to the interior of an ordinary show case;

Fig. 2 is a longitudinal sectional elevation of the device;

Fig. 3 is a transverse sectional elevation taken on the line 3—3 of Fig. 2; and

Fig. 4 is a top plan view of one end of the device illustrating a convenient form of means employed for securing the device within an enclosure.

In the drawings, the device, designated as a whole by the reference character 5, is shown in Fig. 1 as mounted on one of the frame members 6 of an ordinary show case designated as a whole as 7, and provided with upright frame members 8 and having sides, end walls and top 9, 10 and 11 respectively of glass or other transparent material.

In the drawings, the device or holder 5 comprises a perforated main body portion 12 having a series of perforations 13 to provide for the circulation of air therethrough and which preferably is bent to form integral side walls and bottom 14 and 15 respectively, the opposite edges of the body portion abutting along its upper side.

To reinforce and stiffen the body portion and to conceal the abutting edges, a plate or stiffening member 16 is provided along the upper side and secured to the opposite edges of the body portion by the rivets 17, thereby holding the adjacent or abutting edges together.

To provide for additional circulation of the air, the holder 5 may be provided with perforated end walls 18 and 19 which may be held in place, and the entire ends of the holder reinforced and strengthened by the rims 20 and 21 surrounding the ends of the body portion and concealing the adjacent rough edges of the said body portion and end walls.

The rims 20 and 21 may be provided with ears 22 and 23 extending toward each other and overlying, respectively, the reinforcing plate 16 and the bottom 15 of the body portion.

To secure the end walls to the body portion, bolts 24 and 25 may be provided, which pass through the said ears 22 and 23 and the bottom 15 of the body portion, and through the reinforcing plate 16 at the top of the holder, thereby securing in place the end walls 18 and 19 and the end reinforcing rings 20 and 21.

For mounting the device in an enclosure, a pair of arms 26 and 27 may be secured adjacent the ends of the holder 5 and may be provided with openings through their outer ends adapted to receive supporting means connected with the interior of a show case or window, as, for example, the protruding ends of bolts 28 secured to a frame member of an enclosure and adapted to receive the thumb-nuts 29 and 30, thereby providing a convenient fastening for the device and one wherein the removal of the device is greatly facilitated.

To facilitate the packing of the device for shipment and to prevent damage to the arms 26 and 27 when not attached to an enclosure, the said arms may be pivotally connected to the device in such a manner that they may be swung toward each other to occupy a position indicated by dotted lines in Fig. 4, thereby bringing the arms well within the extremities of the holder.

The pivoting of these arms also makes possible the mounting of the device in places where it might otherwise be impossible, if the arms were rigid with respect to the body of the holder.

To remove the moisture from the air of a show case, show window, or other enclosure in which the device may be used, the holder 5 may contain a suitable hygroscopic material, shown, in the present instance, as a pair of moisture attracting and absorbing elements 31 and 32 extending longitudinally of the holder and preferably so formed, in cross-section, that when placed together, they occupy substantially the entire space within the holder.

The moisture absorbing elements 31 and 32 may be bound together in unit form by any suitable means, such, for example, as the wires 33 and 34 surrounding the elements adjacent their ends.

The wires 33 and 34 also serve to space the moisture absorbing elements away from the bottom, sides and top of the holder, while the bolts 24 and 25, in addition to securing the end walls in place, serve to space the elements away from the end walls, thereby reducing to a minimum the points of contact between the device and the surface of the moisture absorbing elements.

It will be observed that by positioning the moisture absorbing elements out of contact with the top, bottom and enclosing walls of the device, substantially the entire surface of the elements is exposed to the air of the enclosure, thereby materially facilitating the removal of moisture therefrom.

To provide additional surface for the attraction of moisture from the air within an enclosure, the inner or abutting faces of the moisture absorbing elements 31 and 32 may be provided with longitudinally extending channels or grooves 35 and 36 respectively, which, when the said elements are secured together as shown in the drawings, form an opening through the central portion of the hygroscopic material to permit of the circulation of the air therethrough, thereby providing for more rapid removal of the moisture from the air of the enclosure.

When the hygroscopic material has taken on its full capacity of moisture from the air of the enclosure, the holder, together with the moisture absorbing elements contained therein, may be removed and subjected to a dehydrating process by heating or otherwise, to restore their hygroscopic condition and thereafter may be again placed within an enclosure and used until they again become saturated with moisture from the air therein.

Obviously, the present invention is not limited to the particular construction and arrangement shown in the illustrative device, but may be variously modified. Moreover, it is not indispensable that all the features of the invention be used conjointly, since they may be used to advantage in variously different combinations and subcombinations.

Having thus described my invention, I claim:

1. An article of the class described comprising a holder or receptacle open to circulation of air; means secured to said holder for securing the same within an enclosure; and a moisture absorbing substance housed and confined within said holder and having its surface spaced therefrom.

2. An article of the class described comprising an elongated holder open to the circulation of air; means mounted on said holder for securing the same within an enclosure; and a moisture absorbing substance open to the circulation of air housed and confined within said holder in a manner to be free from contact therewith.

3. An article of the class described comprising a holder open to the circulation of air; a reinforcing element along one side of said holder; a plurality of arms secured to said holder for mounting the same within a show case or other enclosure; and a moisture absorbing substance contained within said holder.

4. An article of the class described comprising a holder having a plurality of perforations through its side, bottom and end walls; reinforcing means extending longitudinally of said holder and around the ends thereof; and a plurality of arms connected to said holder for mounting the latter within an enclosure.

5. An article of the class described comprising a holder having integral perforated side walls and bottom; a reinforcing strip extending along and connecting the upper edges of said side walls; perforated end walls; reinforcing rings around the ends of said holder and having inwardly extending ears; means cooperable with said ears, reinforcing strip and bottom of said holder for securing said end walls in place; a moisture absorbing substance having an opening therethrough contained within said holder; and a pair of arms pivoted to said means for supporting said holder within an enclosure.

6. In combination, an enclosure; an elongated holder open to the circulation of air within said enclosure; and elongated moisture absorbing means contained within said holder for preventing condensation of moisture within said enclosure, said moisture absorbing means being positioned within said holder in a manner to expose substantially its entire surface to the air of the enclosure.

7. An article of the class described comprising a holder open to the circulation of air of an enclosure; moisture attracting and absorbing means conforming substantially to the form of said holder and mounted therein; and means for positioning said moisture attracting and absorbing means within said holder in a manner to present substantially its entire surface to contact with the air of an enclosure for removing the moisture therefrom.

8. In combination a holder adapted to be mounted in an enclosure and open to the circulation of air therein; a moisture absorbing substance within said holder and positioned with respect thereto in a manner to present substantially its entire surface to the moisture laden air of the enclosure to facilitate the removal of moisture therefrom; and means associated with said holder for mounting the latter within an enclosure.

9. An article of the class described comprising a holder or receptacle open to the circulation of air; means for securing said holder within an enclosure; a moisture absorbing substance contained within said holder; means associated with said substance for positioning the latter with respect to the bottom, top and side walls of the holder; and means associated with the holder for positioning said substance with respect to the end walls of said holder.

10. An article of the class described comprising a holder or receptacle open to the circulation of air; means for securing said holder within an enclosure; a moisture absorbing substance contained within said holder; means for positioning said substance with respect to the bottom, top and side walls of the holder; and means for positioning said substance with respect to the end walls of said holder.

11. An article of the class described comprising a holder open to the circulation of air; a moisture absorbing substance contained within said holder; and means for positioning said substance laterally and longitudinally with respect to said holder.

12. An article of the class described comprising a holder open to the circulation of air; a moisture absorbing substance contained within said holder; and means for spacing said substance with respect to said holder.

In testimony whereof, I have signed my name to this specification.

PAUL S. MOYER.